United States Patent
Kurematsu et al.

(10) Patent No.: US 11,850,806 B2
(45) Date of Patent: Dec. 26, 2023

(54) METHOD FOR MANUFACTURING AIR BAG, AIR BAG, AND VEHICLE SEAT APPARATUS

(71) Applicant: AISIN CORPORATION, Aichi (JP)

(72) Inventors: Yasuhito Kurematsu, Kariya (JP); Makoto Sakai, Kariya (JP); Ryosuke Mizuno, Kariya (JP); Satoshi Masuda, Kariya (JP); Tomokazu Seki, Kariya (JP); Masaaki Hasegawa, Kariya (JP); Tsuyoshi Yamamoto, Kariya (JP); Tomoko Kanbara, Kariya (JP)

(73) Assignee: AISIN CORPORATION, Kariya (JP)

( * ) Notice: Subject to any disclaimer, the term of this patent is extended or adjusted under 35 U.S.C. 154(b) by 302 days.

(21) Appl. No.: 17/205,104

(22) Filed: Mar. 18, 2021

(65) Prior Publication Data

US 2021/0354401 A1  Nov. 18, 2021

(30) Foreign Application Priority Data

May 15, 2020  (JP) .................. 2020-086060

(51) Int. Cl.
| | |
|---|---|
| B29C 65/00 | (2006.01) |
| B60N 2/90 | (2018.01) |
| B29L 31/58 | (2006.01) |
| B29L 31/44 | (2006.01) |

(52) U.S. Cl.
CPC ........ B29C 66/436 (2013.01); B29C 66/8322 (2013.01); B60N 2/914 (2018.02); B60N 2/976 (2018.02); *B29L 2031/443* (2013.01); *B29L 2031/58* (2013.01)

(58) Field of Classification Search
CPC ... B29C 65/18; B29C 66/436; B29C 66/8322; B29L 2031/58

USPC ........................................ 297/284.6
See application file for complete search history.

(56) References Cited

U.S. PATENT DOCUMENTS

| 11,285,854 | B2 * | 3/2022 | Kurematsu | ............ A47C 7/142 |
| 2006/0049678 | A1 | 3/2006 | Kern et al. | |

FOREIGN PATENT DOCUMENTS

| JP | 4305663 B2 | 7/2009 |
| JP | 2015-96403 A | 5/2015 |

OTHER PUBLICATIONS

U.S. Appl. No. 17/020,016, filed Sep. 15, 2020, Yasuhito Kurematsu et al.

* cited by examiner

*Primary Examiner* — James D Sells
(74) *Attorney, Agent, or Firm* — Oblon, McClelland, Maier & Neustadt, L.L.P.

(57) ABSTRACT

A method for manufacturing an air bag includes forming a bag portion surrounded by a welded portion extending in an annular shape by pressing at least one welding mold against two sheet materials arranged to be stacked from a stacking direction of the sheet materials. The welding mold is pressed against the sheet materials to form the welded portion including a welding bead portion protruding to an inside of the bag portion between the sheet materials. A pressing surface of the welding mold against the sheet materials is provided with a slope portion facing in the stacking direction of the sheet materials and in a direction of the inside of the bag portion at a position further on an outside of the bag portion than a position at which the welding bead portion is formed.

12 Claims, 10 Drawing Sheets

METHOD FOR MANUFACTURING AIR BAG, AIR BAG, AND VEHICLE SEAT APPARATUS

CROSS REFERENCE TO RELATED APPLICATIONS

This application is based on and claims priority under 35 U.S.C. § 119 to Japanese Patent Application No. 2020-086060, filed on May 15, 2020, the entire content of which is incorporated herein by reference.

TECHNICAL FIELD

This disclosure generally relates to a method for manufacturing an air bag, an air bag, and a vehicle seat apparatus.

BACKGROUND DISCUSSION

Conventionally, for example, JP 4305663 B2 describes a vehicle seat apparatus configured so that an occupant seated on a seat can obtain a desired refreshing effect by expanding or contracting an air bag provided inside the seat surface cover. Also, as such an air bag for use in a seat of a vehicle, for example, as described in JP 2015-96403 A, there is one provided with a bag portion formed by attaching two sheet materials to each other. By using such an air bag, the configuration can be simplified.

However, the above-mentioned air bag has a structure in which, in a case in which the bag portion is filled with air to expand the bag portion, stress is easily concentrated on a portion at which the respective sheet materials are attached to each other, that is, a peripheral portion of the bag portion. Therefore, in a case in which an excessive load is applied to the bag portion, a broken portion may be formed at the peripheral portion, and thus there is still room for improvement in this respect.

A need thus exists for a method for manufacturing an air bag, an air bag, and a vehicle seat apparatus which are not susceptible to the drawback mentioned above.

SUMMARY

A method for manufacturing an air bag includes forming a bag portion surrounded by a welded portion extending in an annular shape by pressing at least one welding mold against two sheet materials arranged to be stacked from a stacking direction of the sheet materials. The welding mold is pressed against the sheet materials to form the welded portion including a welding bead portion protruding to an inside of the bag portion between the sheet materials. A pressing surface of the welding mold against the sheet materials is provided with a slope portion facing in the stacking direction of the sheet materials and in a direction of the inside of the bag portion at a position further on an outside of the bag portion than a position at which the welding bead portion is formed.

An air bag includes a bag portion surrounded by a welded portion formed in an annular shape formed by two sheet materials welded to each other. The welded portion includes a first welded portion formed at a position outside the bag portion, a welding bead portion formed between the sheet materials in a state of protruding to an inside of the bag portion, a second welded portion formed at a position between the welding bead portion and the first welded portion in a state of bulging to an outside of the bag portion, and a filling portion forming a slope connecting an outer surface of the second welded portion facing in a stacking direction of the sheet materials to an outer surface of the sheet material by filling at the outside of the bag portion a boundary portion between the second welded portion and a connecting end of the sheet material connected to the second welded portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinbelow, an embodiment of an air bag and a vehicle seat apparatus will be described with reference to the drawings.

Figure 1:
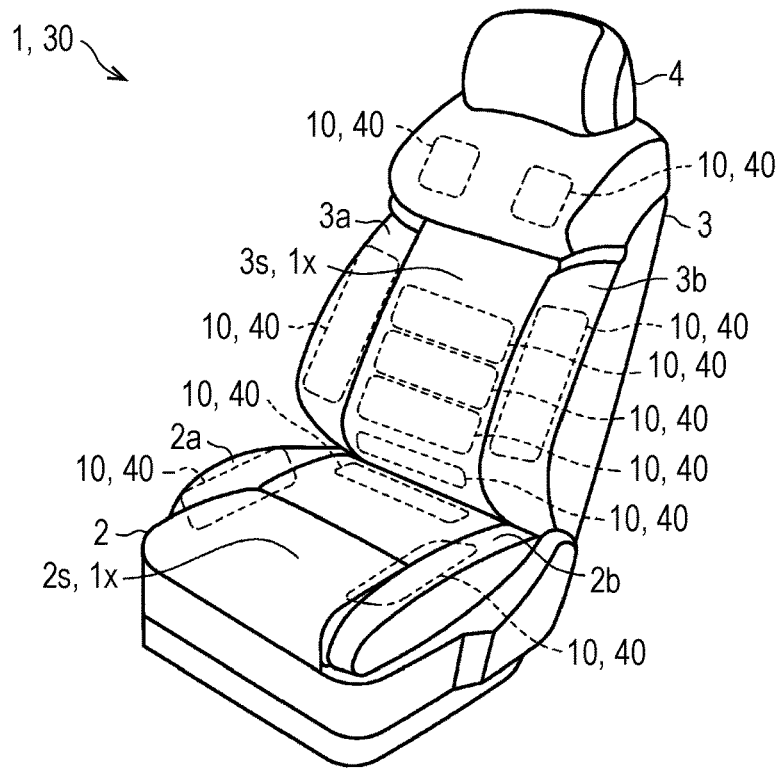
FIG. 1 is a perspective view of a vehicle seat in which an air bag is provided inside a seat surface cover.
Figure 2:
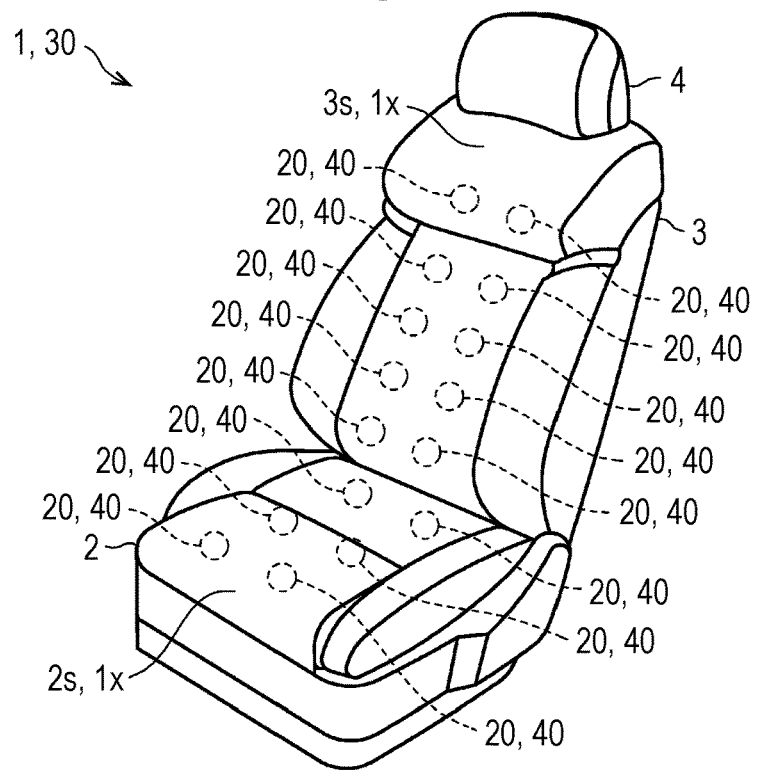
FIG. 2 is a perspective view of the vehicle seat provided with an air bag inside the seat surface cover.

As illustrated in FIGS. 1 and 2, a vehicle seat 1 includes a seat cushion 2 and a seat back 3 provided at a rear end portion of the seat cushion 2. A headrest 4 is provided at an upper end of the seat back 3.

Also, in the seat 1 according to the present embodiment, both side portions 3a and 3b of the seat back 3 are formed to bulge forward, respectively. Further, both side portions 2a and 2b of the seat cushion 2 are formed to bulge upward, respectively. As a result, the seat 1 according to the present embodiment can secure a good sitting posture of an occupant and maintain the sitting posture.

Also, the seat 1 is provided with a plurality of air bags 10 that expand or contract inside the seat cushion 2 and the seat back 3 to change the support shape of the seat 1. Further, the seat 1 is provided with a plurality of air bags 20 that similarly expand or contract inside the seat cushion 2 and the seat back 3 to press a seat surface cover 1x from the inside. In the present embodiment, a seat apparatus 30 is formed that can change the support shape of the seat 1 and impart a refreshing effect to the occupant seated on the seat 1.

Specifically, in the seat 1 according to the present embodiment, the independent air bags 10 for seat support are provided inside the seat back 3 at positions corresponding to the shoulders, waist, and lower end of a backrest surface 3s, respectively. Note that the arrangement positions of the air bags 10 are sometimes referred to as a shoulder portion, a lumbar portion, a back pelvis portion, or the like, respectively. Also, the independent air bags 10 for seat support are provided at positions corresponding to both the side portions 3a and 3b of the seat back 3, respectively. The seat cushion 2 is also provided with the independent air bags 10 for seat support on the inside of the rear end portion of a seating surface 2s and on the insides of both the side portions 2a and 2b, respectively.

Also, inside the seat back 3, the plurality of air bags 20 for refreshment are provided along the backrest surface 3s. Further, in the seat cushion 2, the plurality of air bags 20 for massage are provided along the seating surface 2s. Specifically, the respective air bags 20 in the seat back 3 are provided side by side in two rows along the up-down direction of the backrest surface 3s. Similarly, the respective air bags 20 in the seat cushion 2 are provided side by side in two rows along the front-rear direction of the seating surface 2s.

Figure 3:
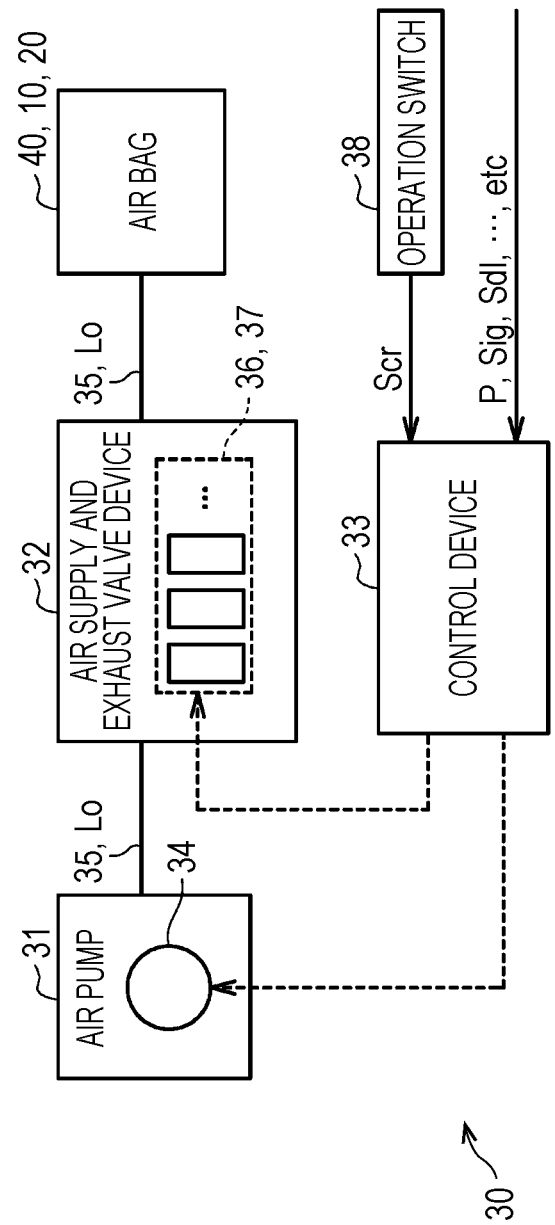
FIG. 3 is a schematic configuration diagram of a seat apparatus.

As illustrated in FIG. 3, the seat apparatus 30 according to the present embodiment includes an air pump 31 that pumps air to each of the air bags 10 for seat support and each of the air bag 20 for massage. Also, an air supply and exhaust valve device 32 is interposed between the air pump 31 and the air bags 10 and 20. In the seat apparatus 30 according to the present embodiment, the operations of the air pump 31 and the air supply and exhaust valve device 32 are controlled by a control device 33.

Specifically, as the air pump 31 according to the present embodiment, an electric pump that uses a motor 34 as a driving source is used. Also, the air supply and exhaust valve device 32 is connected to each of the air bags 20 and the air pump 31 via flexible resin air tubes 35. That is, in the seat apparatus 30 according to the present embodiment, air flow paths or air supply and exhaust flow paths Lo that connect the air bags 10 and 20 to the air pump 31 are formed by the air tubes 35 and internal paths of the air supply and exhaust valve device 32. The air supply and exhaust valve device 32 according to the present embodiment is thus configured to arrange air supply valves 36 and air exhaust valves 37 thereof in the middle of the air supply and exhaust flow paths Lo.

Also, the control device 33 according to the present embodiment is supplied with an operation input signal Scr, an ignition signal Sig, a door lock signal Sdl, or the like in response to an operation switch 38 provided on the seat 1. The control device 33 according to the present embodiment is configured to control operations of the air pump 31 and the air supply and exhaust valve device 32 in order to expand or contract each of the air bags 10 and 20 based on these control signals.

Specifically, the control device 33 according to the present embodiment detects internal pressure P of each of the air bags 10 for seat support and maintains a target value for the internal pressure P. Note that the target value for the internal pressure is updated as the user sets an optimum seat support shape with use of the operation switch 38 provided on the seat 1. The control device 33 according to the present embodiment is configured to control operations of the air pump 31 and the air supply and exhaust valve device 32 in order to match the internal pressure P of each of the air bags 10 with the target value for the internal pressure when the vehicle is started, for example, when an IG is turned on, to expand each of the air bags 10 for seat support.

Also, the control device 33 according to the present embodiment switches the states of some of the air bags 20 for massage to the expanded states based on a predetermined operation pattern. As a result, the seat apparatus 30 according to the present embodiment allows the occupant seated on the seat 1 to obtain a desired refreshing effect.

(Air Bag)

Next, a structure of an air bag for use in the seat apparatus 30 according to the present embodiment and a method for manufacturing the air bag will be described.

Figure 4:
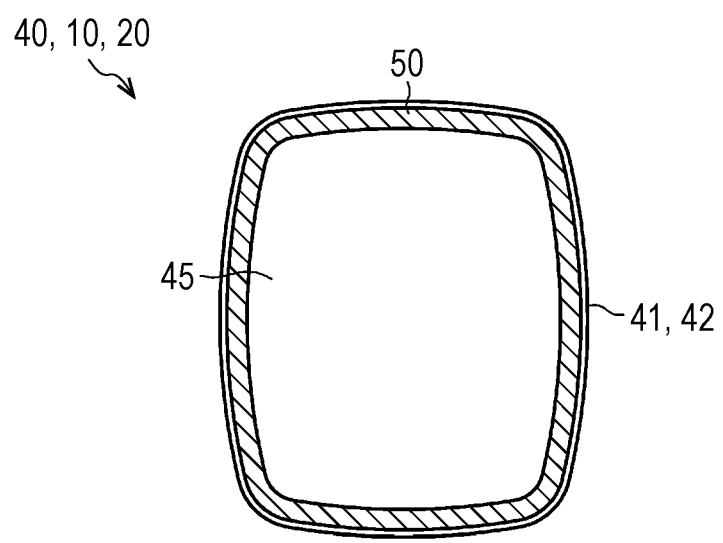
FIG. 4 is a plan view of the air bag.
Figure 5:
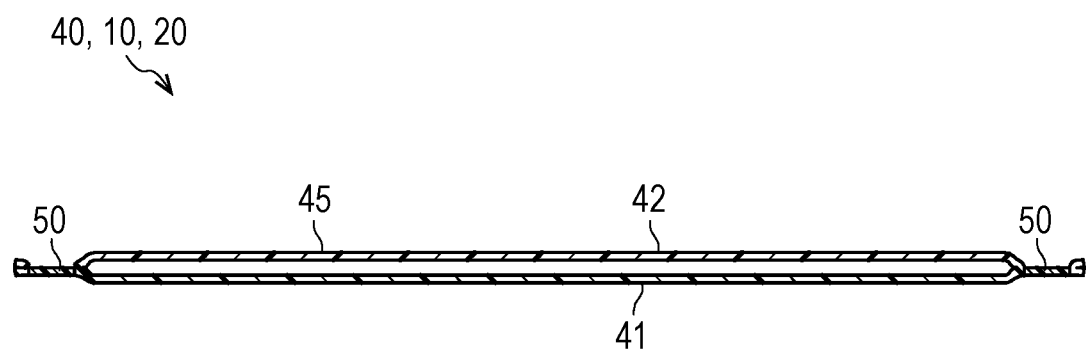
FIG. 5 is a cross-sectional view of the air bag.

As illustrated in FIGS. 4 and 5, in the seat apparatus 30 according to the present embodiment, an air bag 40 used for each of the air bags 10 for seat support and each of the air bags 20 for massage includes a bag portion 45 formed by attaching two sheet materials 41 and 42 to each other. Note that FIG. 4 illustrates an example in which the planar shape of the air bag 40 is simplified. That is, the air bag 40 is expanded by filling air between the two sheet materials 41 and 42 forming the bag portion 45. The seat apparatus 30 according to the present embodiment has a configuration in which the bag portion 45 of each of the expanded air bags 40 presses the seat surface cover 1x from the inside.

In the seat apparatus 30 according to the present embodiment, a flexible resin material such as vinyl chloride is used for each of the sheet materials 41 and 42 constituting the air bag 40. Also, for welding of the sheet materials 41 and 42, a high frequency welding method is used, for example. In FIGS. 4 and 5, a welded portion 50 of both the sheet materials 41 and 42 that seals a peripheral portion of the bag portion 45 is illustrated by hatching.

Figure 6:
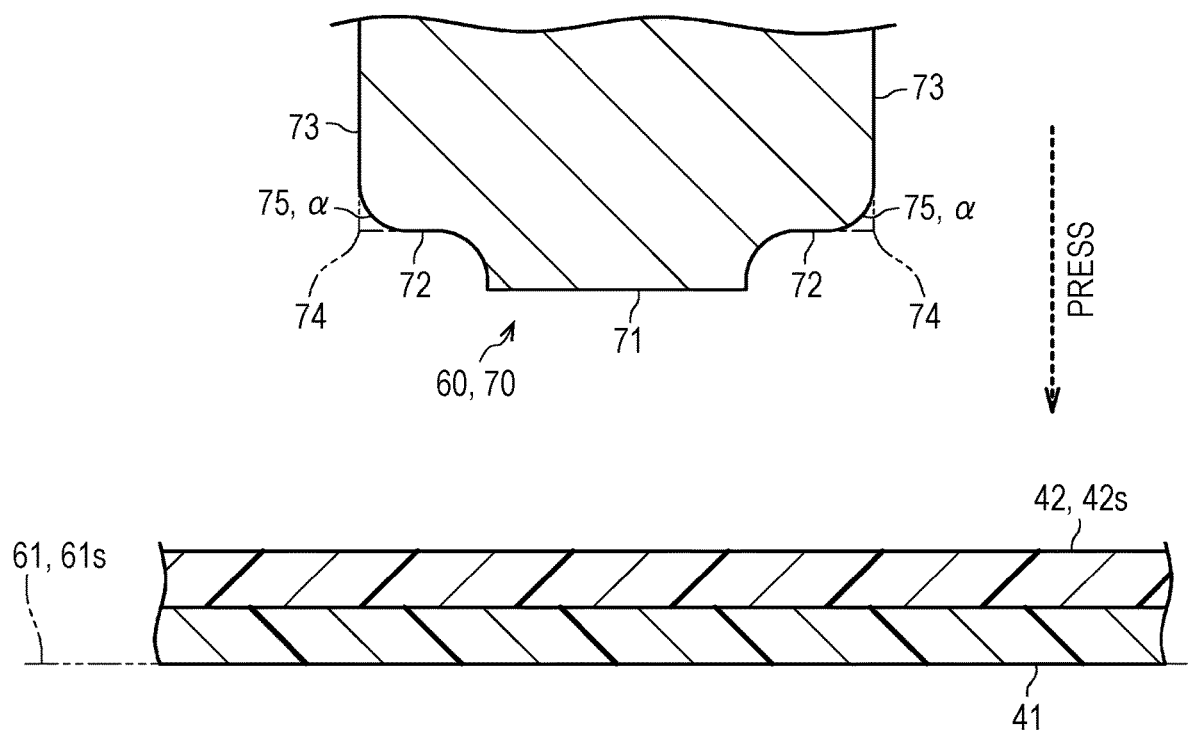
FIG. 6 is a cross-sectional view illustrating a method for manufacturing an air bag.
Figure 7:
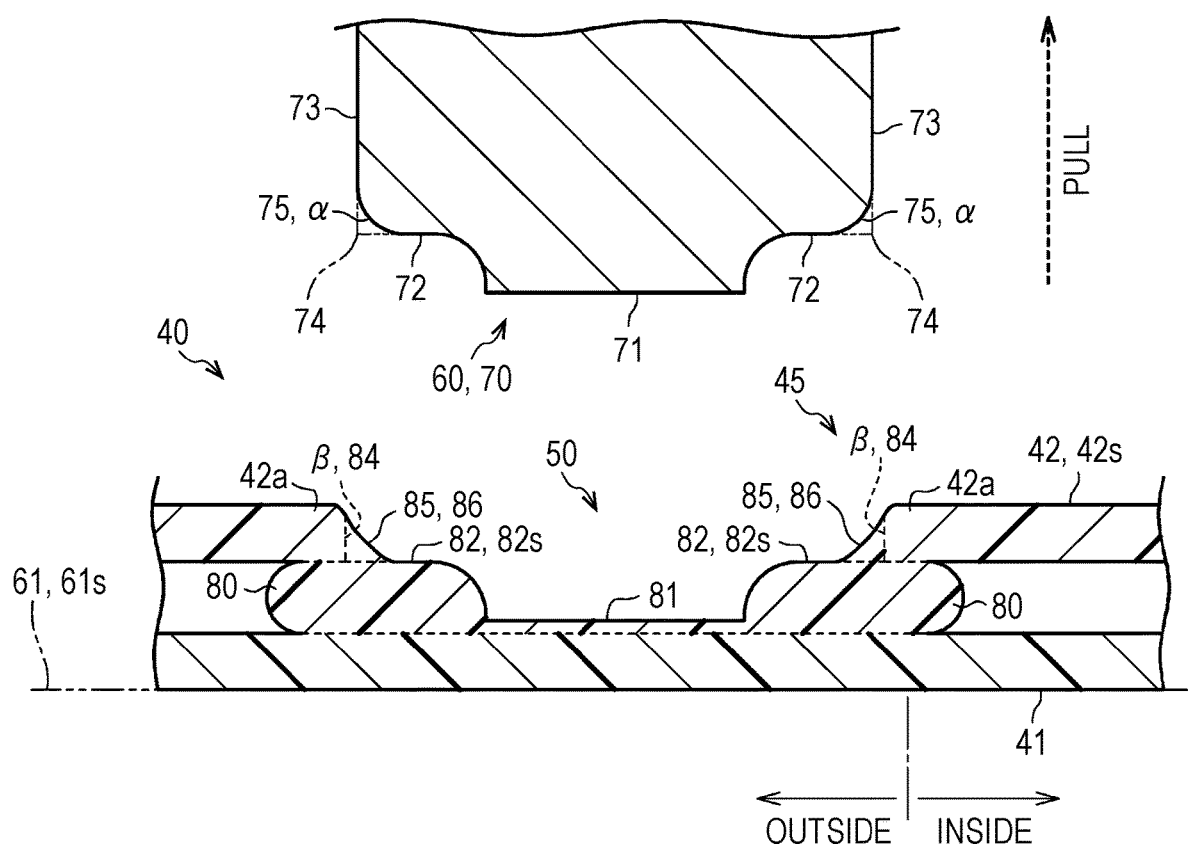
FIG. 7 is a cross-sectional view illustrating the method for manufacturing an air bag.

Also, as illustrated in FIGS. 6 and 7, the air bag 40 is formed by pressing a welding mold 60 against the two sheet materials 41 and 42 stacked in the thickness direction from the stacking direction.

Specifically, in the present embodiment, the welding mold 60 is pressed from above against the two sheet materials 41 and 42 arranged to be stacked on a workbench 61. As a result, at a position at which the welding mold 60 is pressed, the sheet material 42 stacked on the sheet material 41, that is, the sheet material 42 having an outer surface 42s thereof pressed by the welding mold 60, mainly melts. Note that, although, at the position at which the welding mold 60 is pressed, the sheet material 41 located on the lower side as well as a boundary portion with the sheet material 42 also melts, illustration thereof is omitted in FIG. 7 and each of the subsequent figures for convenience of explanation. Also, the portion to which the welding mold 60 is pressed is deformed to conform to the cross-sectional shape of the welding mold 60. In the air bag 40 according to the present embodiment, the welding mold 60 is then pulled upward and separated from the outer surface 42s of the sheet material 42 to form the welded portion 50 of both the sheet materials 41 and 42.

Also, in the present embodiment, the planar shape of a pressing surface 70 of the welding mold 60 for use in forming the air bag 40 is set so that the welded portion 50 extending in an annular shape is formed by the welding mold 60. The air bag 40 according to the present embodiment is configured to include the bag portion 45 surrounded by the annular welded portion 50 formed by the two sheet materials 41 and 42 welded to each other.

For example, in a case of forming the bag portion 45 having a substantially rectangular planar shape as illustrated in FIG. 5, the welding mold 60 having the substantially square frame-shaped pressing surface 70 surrounding the outer periphery of the bag portion 45 is pressed against the sheet materials 41 and 42. The air bag 40 according to the present embodiment is configured so that the entire peripheral portion of the bag portion 45 is sealed by the annular welded portion 50 surrounding the bag portion 45.

Note that, for convenience of explanation, only the cross section orthogonal to the pressing surface 70 of the welding mold 60 is illustrated in FIGS. 6 and 7. Also, since the welding mold 60 according to the present embodiment has a symmetrical cross-sectional shape, the welded portion 50 can seal the space between the sheet materials 41 and 42 on both sides in the direction of the surfaces of the sheet materials 41 and 42 spreading to the right and the left with a center line orthogonal to the pressing surface 70 interposed therebetween in each of the figures. The air bag 40 according to the present embodiment has a configuration in which the bag portion 45 is formed on the right side of the welded portion 50 in each of the figures.

More specifically, the welding mold 60 for use in forming the air bag 40 according to the present embodiment includes as the pressing surface 70 a first pressing surface 71 to be pressed against the outer surface 42s of the sheet material 42. In the welding mold 60 according to the present embodiment, the first pressing surface 71 is a flat surface to be pressed in a state of being substantially parallel to the outer surface 42s of the sheet material 42. The welding mold 60 according to the present embodiment includes a second pressing surface 72 to be pressed against the outer surface 42s of the sheet material 42 at a position further backward in the pressing direction than the first pressing surface 71, that is, at a position further on the upper side than the first pressing surface 71 in each of the figures.

Further, in the welding mold 60 according to the present embodiment, a corner portion 74 formed by the second pressing surface 72 and a side wall surface 73 intersecting with the second pressing surface 72 is chamfered. Specifically, in the present embodiment, the corner portion 74 is subject to so-called "round chamfering", that is, a chamfering treatment to form a convex curved surface shape. Accordingly, the welding mold 60 according to the present embodiment includes at a boundary portion α between the second pressing surface 72 and the side wall surface 73 a slope portion 75 facing in the stacking direction of the sheet materials 41 and 42 (lower side in each of the figures) and in the direction of the inside of the bag portion 45 formed by the sheet materials 41 and 42 (right side in each of the figures) in a state of being opposed to the outer surface 42s of the sheet material 42.

That is, the welding mold 60 according to the present embodiment is pressed against the outer surface 42s of the sheet material 42 by sandwiching both the sheet materials 41 and 42 between the pressing surface 70 and a mounting surface 61s of the workbench 61 to form the welded portion 50 in a manner of pushing away the melted resin component, that is, the constituent of the sheet material 42 mainly, toward the side wall surface 73 (right-left direction in FIG. 7). In the air bag 40 according to the present embodiment, the welded portion 50 thus includes a welding bead portion 80 protruding to the inside of the bag portion 45 between the sheet materials 41 and 42.

Specifically, the welding mold 60 according to the present embodiment forms as the welded portion 50 a first welded portion 81, which is thinnest in the stacking direction of both the sheet materials 41 and 42 (up-down direction in FIG. 7), at a portion sandwiched between the most protruded first pressing surface 71 and the mounting surface 61s of the workbench 61 having as flat a surface shape as that of the first pressing surface 71. The welding mold 60 according to the present embodiment also forms as the welded portion 50 a second welded portion 82 continuous with the welding bead portion 80 in a state of bulging to the outside of the bag portion 45. That is, in the welded portion 50 according to the present embodiment, the first welded portion 81 is formed at a position outside the bag portion 45. Further, the second welded portion 82 is thicker in the stacking direction than the first welded portion 81 and is formed at a position between the first welded portion 81 and the welding bead portion 80. As a result, in the air bag 40 according to the present embodiment, the sheet material 42, which is one sheet material forming the bag portion 45, is connected to an outer surface 82s of the second welded portion 82 constituting the welded portion 50.

Figure 8:
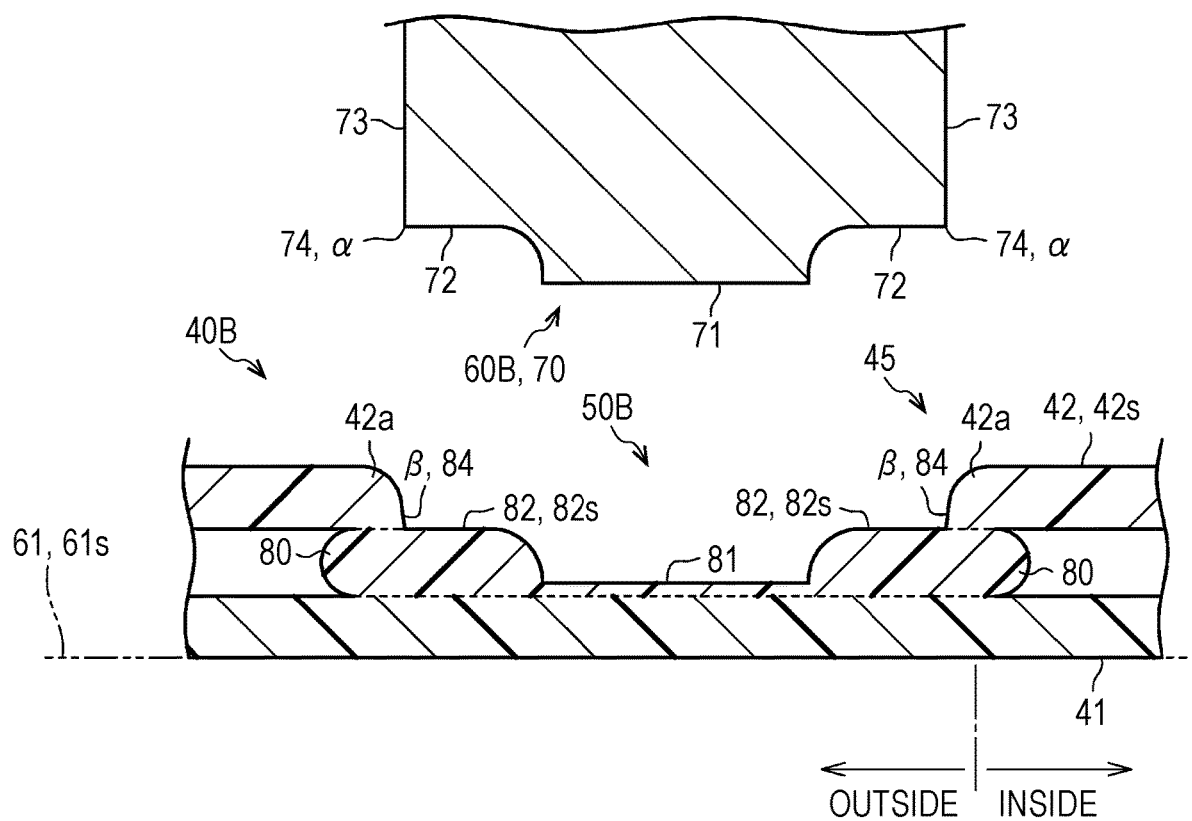
FIG. 8 is a cross-sectional view illustrating a method for manufacturing an air bag according to a comparative example.

Here, FIG. 8 illustrates a welding mold 60B according to a comparative example. The welding mold 60B includes the corner portion 74 formed at the boundary portion α between the pressing surface 70 and the side wall surface 73 so that the pressing surface 70 and the side wall surface 73 intersect substantially at a right angle. That is, no chamfering treatment is performed in the welding mold 60B according to the comparative example unlike in the welding mold 60 according to the present embodiment.

Figure 9:
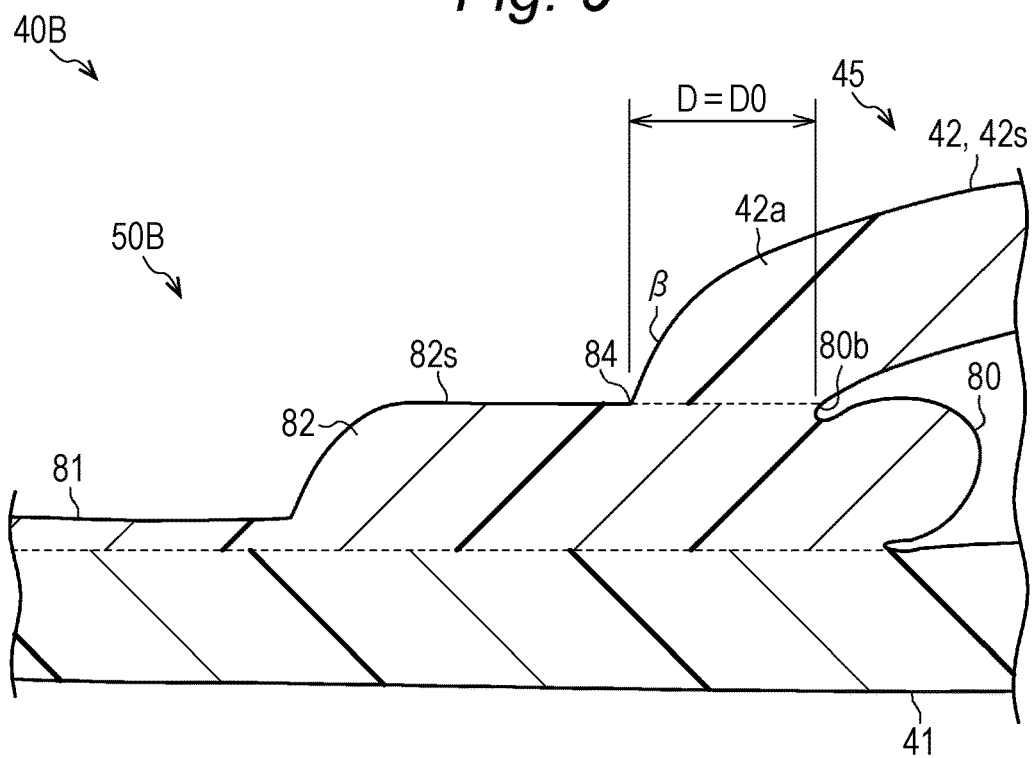
FIG. 9 is a cross-sectional view of the vicinity of a welded portion formed with use of a welding mold according to the comparative example.

Therefore, as illustrated in FIGS. 8 and 9, in a welded portion 50B of an air bag 40B formed with use of the welding mold 60B, a corner 84 is likely to be formed at a boundary portion β between the second welded portion 82 formed on the outside of the bag portion 45 and a connecting end 42a of the sheet material 42 connected to the second welded portion 82. That is, the corner 84 at the boundary portion β is in a concave shape corresponding to the corner portion 74 of the welding mold 60B.

Figure 10:
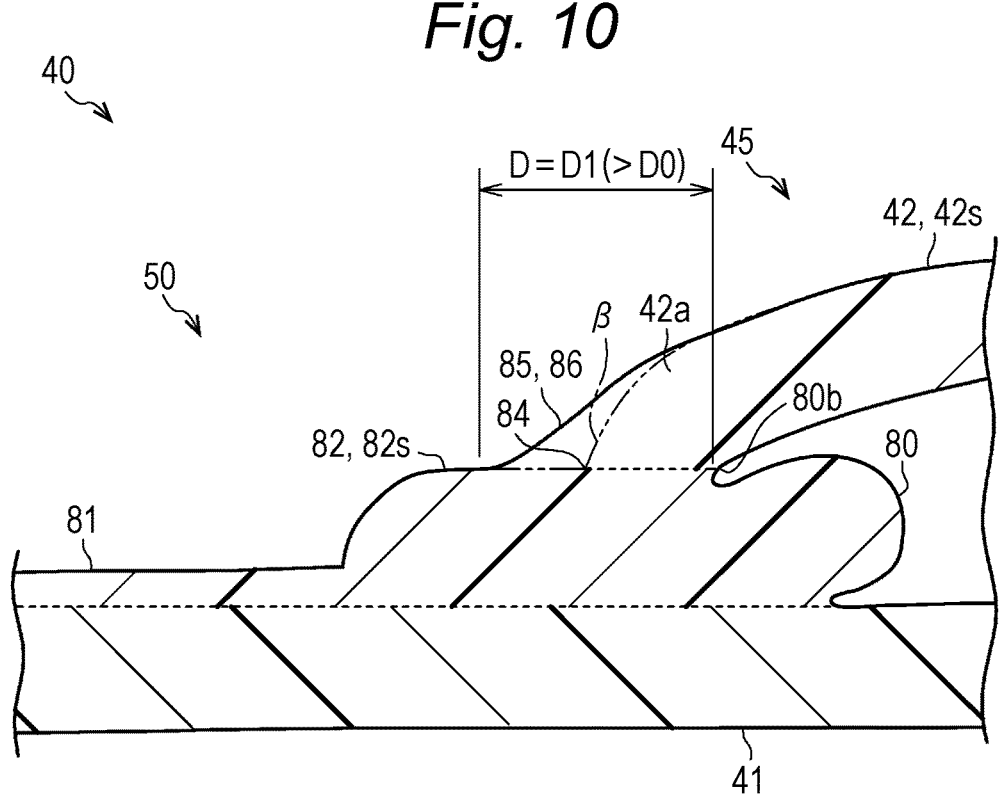
FIG. 10 is a cross-sectional view of the vicinity of a welded portion formed with use of a welding mold.

On the other hand, as illustrated in FIGS. 7 and 10, the welded portion 50 of the air bag 40 formed with use of the welding mold 60 according to the present embodiment includes on the outside of the bag portion 45 a slope 85 connecting the outer surface 82s of the second welded portion 82 facing in the stacking direction of both the sheet materials 41 and 42 to the outer surface 42s of the sheet material 42 to which the welding mold 60 is pressed.

That is, in the welding mold 60 according to the present embodiment, as described above, the corner portion 74 formed by the pressing surface 70 and the side wall surface 73 is chamfered to form the slope portion 75 at the boundary portion α between the pressing surface 70 and the side wall surface 73. As a result, the welded portion 50 of the air bag 40 formed with use of the welding mold 60 is configured to have the slope 85 corresponding to the slope portion 75 of the welding mold 60.

That is, the welding mold 60 according to the present embodiment has a configuration in which the constituent of the sheet material 42 pushed away toward the side wall surface 73 as the pressing surface 70 of the welding mold 60, more specifically, the first pressing surface 71 and the second pressing surface 72, are pressed, moves to the boundary portion α between the side wall surface 73 and the second pressing surface 72 of the welding mold 60 along the slope portion 75. Also, as a result, in the welded portion 50 of both the sheet materials 41 and 42, the boundary portion β between the second welded portion 82 formed between the welding bead portion 80 and the first welded portion 81 in a state of bulging to the outside of the bag portion 45 and the connecting end 42a of the sheet material 42 connected to the second welded portion 82 is filled. In the air bag 40 according to the present embodiment, the slope 85 connecting the outer surface 82s of the second welded portion 82 to the outer surface 42s of the sheet material 42 is formed by a filling portion 86 filling the boundary portion β between the second welded portion 82 and the connecting end 42a of the sheet material 42.

Next, an operation of the present embodiment will be described.

That is, by pressing the welding mold 60 against the two sheet materials 41 and 42 stacked in the thickness direction from the stacking direction, the welded portion 50 of both the sheet materials 41 and 42 is formed. By setting the planar shape of the pressing surface 70 for the welding mold 60 so that the welded portion 50 is in an annular shape, the bag portion 45 of the air bag 40 is formed in a state in which the peripheral portion is sealed by the welded portion 50.

Also, the welded portion 50 formed with use of such a welding mold 60 includes the welding bead portion 80 protruding to the inside of the bag portion 45 between the sheet materials 41 and 42 forming the bag portion 45. Therefore, for example, in a case in which an excessive load is applied to the expanded bag portion 45, the stress is likely to be concentrated on a base end portion 80b of the welding bead portion 80. As a result, the bag portion 45 may be torn in a manner in which the welded portion 50 is broken along the direction of the surfaces of the sheet materials 41 and 42 (right-left direction in FIGS. 9 and 10) from the base end portion 80b of the welding bead portion 80 toward the outside of the bag portion 45.

However, by using the welding mold 60 according to the present embodiment, a thickness D of the welded portion 50 along the direction of the surfaces of the sheet materials 41 and 42 near the base end portion 80b of the welding bead portion 80 increases (D1>D0). As a result, tear of the bag portion 45 due to the breakage of the welded portion 50 is less likely to occur, and the durability of the air bag 40 is improved.

Next, an effect of the present embodiment will be described.

(1) In the air bag 40, by pressing the welding mold 60 against the two sheet materials 41 and 42 arranged to be stacked from the stacking direction of the sheet materials 41 and 42, the bag portion 45 surrounded by the welded portion 50 extending in an annular shape is formed. Also, the welding mold 60 is pressed against the outer surface 42s of the sheet material 42 to cause the welded portion 50 of the sheet materials 41 and 42 including the welding bead portion 80 protruding to the inside of the bag portion 45 between the sheet materials 41 and 42 to be formed. The pressing surface 70 of the welding mold 60 against the sheet material 42 is provided with the slope portion 75 facing in the stacking direction of the sheet materials 41 and 42 and in the direction of the inside of the bag portion 45 at a position further on the outside of the bag portion 45 than the position at which the welding bead portion 80 is formed.

That is, the welded portion 50 of the sheet materials 41 and 42 is formed at a position to which the pressing surface 70 of the welding mold 60 is pressed to cause the bag portion 45 whose peripheral portion is surrounded by the welded portion 50 to be formed. Also, at this time, the constituent of the sheet material 42 pushed away by the pressing surface 70 of the welding mold 60 moves to a position inside the bag portion 45 along the direction of the surfaces of the sheet materials 41 and 42 to cause the welding bead portion 80 protruding to the inside of the bag portion 45 to be formed. Further, according to the above configuration, the constituent of the sheet material 42 pushed away by the welding mold 60 moves along the slope portion 75 provided on the pressing surface 70. As a result, the thickness D of the welded portion 50 along the direction of the surfaces of the sheet materials 41 and 42 near the base end portion 80b of the welding bead portion 80 increases. That is, it is possible to increase the thickness of a portion of the welded portion 50 at which breakage starting from the base end portion 80b of the welding bead portion 80 is likely to occur. As a result, tear of the bag portion 45 due to the breakage of the welded portion 50 is less likely to occur, and the durability of the air bag 40 can be improved.

(2) The slope portion 75 has a convex curved surface shape. As a result, it is possible to more effectively increase the thickness of the portion of the welded portion 50 at which breakage is likely to occur.

(3) The slope portion 75 is formed by chamfering the corner portion 74 formed by the pressing surface 70 of the welding mold 60 and the side wall surface 73 of the welding mold 60 intersecting with the pressing surface 70.

According to the above configuration, the welding mold 60 can easily be provided with a simple configuration with the slope portion 75 facing in the stacking direction of the sheet materials 41 and 42 and in the direction of the inside of the bag portion 45 at a position further on the outside of the bag portion 45 than the position at which the welding bead portion 80 is formed.

(4) The welding mold 60 includes as the pressing surface 70 the first pressing surface 71 pressed against the outer surface 42s of the sheet material 42 and the second pressing surface 72 pressed against the outer surface 42s of the sheet material 42 at a position further backward in the pressing direction of the welding mold 60 than the first pressing surface 71. The slope portion 75 is provided at the boundary portion α between the second pressing surface 72 and the side wall surface 73 of the welding mold 60 intersecting with the second pressing surface 72.

According to the above configuration, the first welded portion 81 is formed at a position to which the first pressing surface 71 is pressed at a position outside the bag portion 45. Further, at a position to which the second pressing surface 72 is pressed, the second welded portion 82 is formed in a state of bulging from the welding bead portion 80 formed inside the bag portion 45 to the outside of the bag portion 45. As a result, the thickness of the welded portion 50 in the stacking direction of the sheet materials 41 and 42 can be increased near the base end portion 80b of the welding bead portion 80.

Also, the constituent of the sheet material 42 pushed away by the second pressing surface 72 moves along the slope portion 75 to the boundary portion α between the second pressing surface 72 and the side wall surface 73 of the welding mold 60. As a result, the boundary portion β between the second welded portion 82 formed between the welding bead portion 80 and the first welded portion 81 and the connecting end 42a of the sheet material 42 connected to the second welded portion 82 is filled. Further, the slope 85 connecting the outer surface 82s of the second welded portion 82 to the outer surface 42s of the sheet material 42 is formed by the filling portion 86 filling the boundary portion β between the second welded portion 82 and the connecting end 42a of the sheet material 42. As a result, the thickness D of the welded portion 50 along the direction of the surfaces of the sheet materials 41 and 42 near the base end portion 80b of the welding bead portion 80 increases. As a result, breakage of the welded portion 50 starting from the base end portion 80b of the welding bead portion 80 is less likely to occur, and the durability of the air bag 40 can be improved.

The above embodiment can be modified and carried out in the following manner. The above embodiment and the following modification examples can be carried out in combination with each other in a technically consistent range.

Although the above embodiment is embodied in the seat apparatus 30 provided in the seat 1 of the vehicle as the air bag 40 for use as each of the air bags 10 for seat support and each of the air bags 20 for massage, the above embodiment may be applied to an air bag for use in applications other than the seat apparatus 30.

Also, the material for each of the sheet materials 41 and 42 constituting the air bag 40 may arbitrarily be changed as long as the welded portion 50 can be formed with use of the welding mold 60. Also, the planar shape of the bag portion 45 surrounded by the annular welded portion 50 may arbitrarily be changed.

The planar shape of the pressing surface 70 of the welding mold 60 does not necessarily have to be an annular shape. That is, the annular welded portion 50 surrounding the entire periphery of the bag portion 45 may be formed not only by one pressing operation but also by a plurality of pressing operations. Further, the peripheral portion of the bag portion 45 may be sealed not only by a welding process of pressing the welding mold 60 but also by a configuration in which, after the air tube 35 forming the air supply and exhaust flow path Lo is inserted between the two sheet materials 41 and 42 serving as base materials, a gap of the welded portion 50 left for the air tube 35 to be inserted therein is sealed to complete the bag portion 45.

In the above embodiment, the welding mold 60 includes as the pressing surface 70 the first pressing surface 71 and the second pressing surface 72 further backward than the first pressing surface 71. By chamfering the corner portion 74 formed by the second pressing surface 72 and the side wall surface 73 of the welding mold 60, the slope portion 75 has a convex curved surface shape and is provided at the boundary portion α between the second pressing surface 72 and the side wall surface 73. However, the shape of the slope portion 75 is not limited, and the slope portion 75 does not necessarily have to have a convex curved surface shape. For example, the chamfering treatment of the corner portion 74 may be a "square chamfering" treatment instead of the so-called "round chamfering" treatment.

Figure 11:
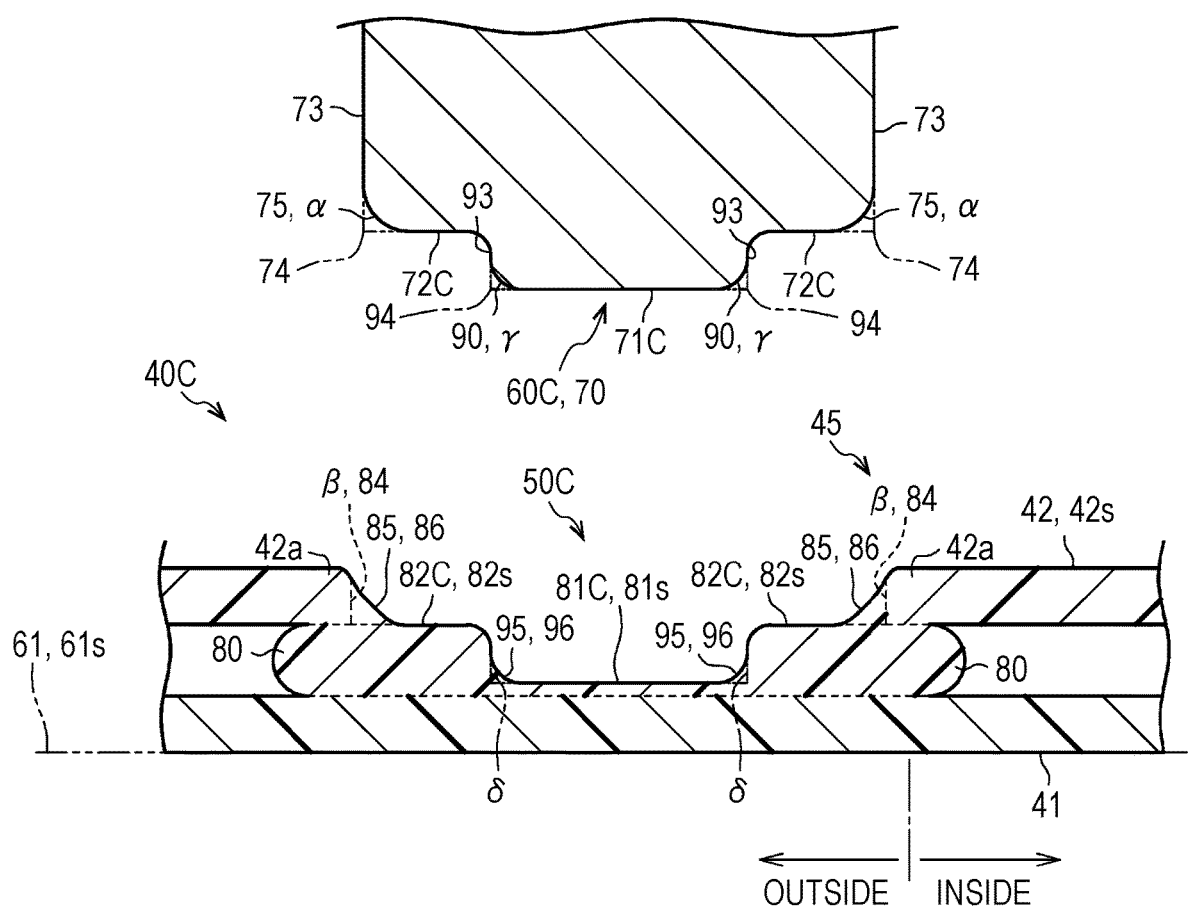
FIG. 11 is a cross-sectional view illustrating a method for manufacturing an air bag according to another example.

Also, as illustrated in FIG. 11, with use of a welding mold 60C including a second slope portion 90 provided at a boundary portion γ between a first pressing surface 71C and a second pressing surface 72C, a welded portion 50C surrounding the bag portion 45 of an air bag 40C may be formed.

Specifically, in the welding mold 60C according to another example, the second slope portion 90 is formed by chamfering a corner portion 94 formed by a second side wall surface 93 of the welding mold 60, formed by the first pressing surface 71C and the second pressing surface 72C arranged in a staircase pattern, and the first pressing surface 71C. Also, the welded portion 50C formed with use of the welding mold 60C includes a second filling portion 95 filling a boundary portion β between a first welded portion 81C and a second welded portion 82C. Further, the second filling portion 95 forms a second slope 96 connecting an outer surface 81s of the first welded portion 81C to the outer surface 82s of the second welded portion 82C. As a result, tear of the bag portion 45 due to breakage of the welded portion 50C is much less likely to occur. Accordingly, the durability of the air bag 40 can be improved.

Figure 12:
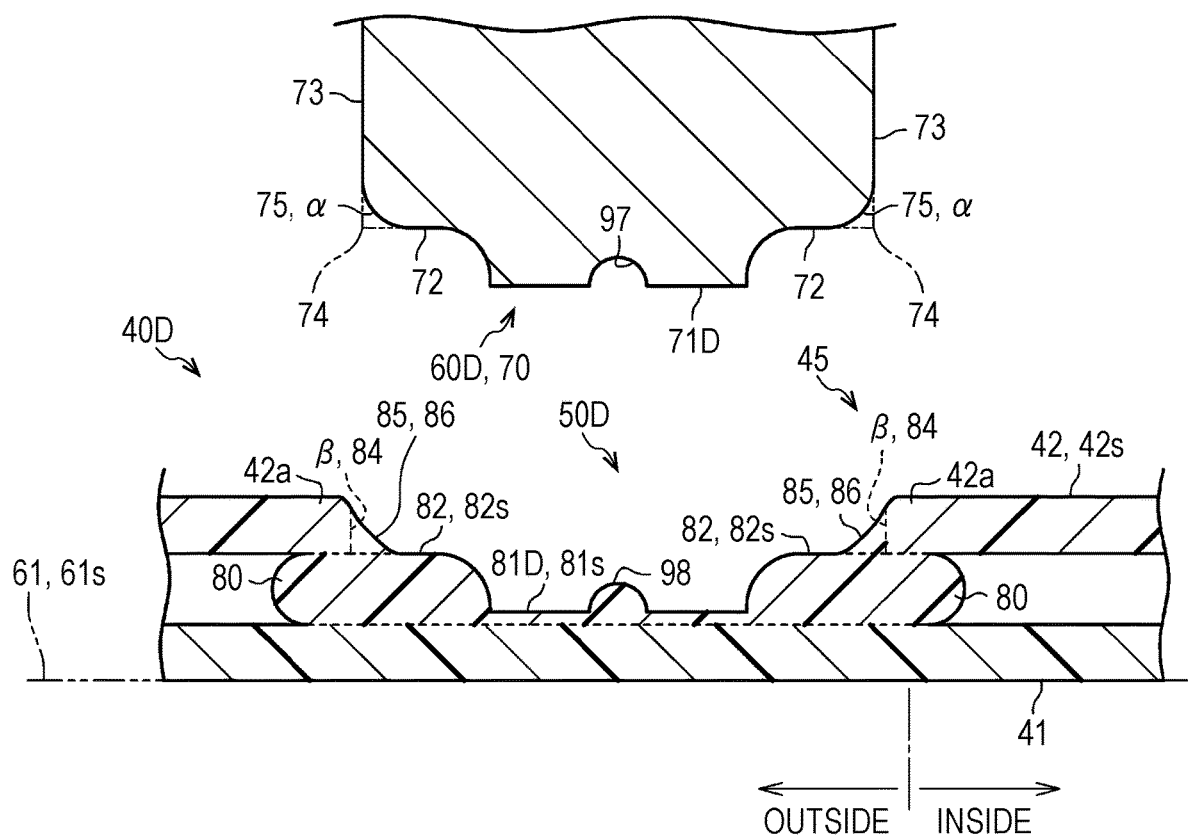
FIG. 12 is a cross-sectional view illustrating a method for manufacturing an air bag according to another example.

Also, as illustrated in FIG. 12, a welding mold 60D having a recess 97 on the pressing surface 70 may be used to form a welded portion 50D surrounding the bag portion 45 of an air bag 40D. Specifically, in the welding mold 60D according to another example, the recess 97 is formed on a first pressing surface 71D. The position on the pressing surface 70 at which the recess 97 is formed may arbitrarily be changed. The welded portion 50D formed with use of the welding mold 60D is provided with a protruding portion 98 protruding from the outer surface 81s of a first welded portion 81D.

That is, by using such a welding mold 60D according to another example, the amount of the constituent of the sheet material 42 that moves to the position inside the bag portion 45 by being pushed away by the welding mold 60 is reduced. Further, as a result, the amount of the welding bead portion 80, formed between the sheet materials 41 and 42, protruding to the inside of the bag portion 45 is reduced. As a result, stress is less likely to concentrate on the base end portion 80b of the welding bead portion 80. Accordingly, breakage of the welded portion 50D is less likely to occur, and the durability of the air bag 40 can be improved.

Figure 13:
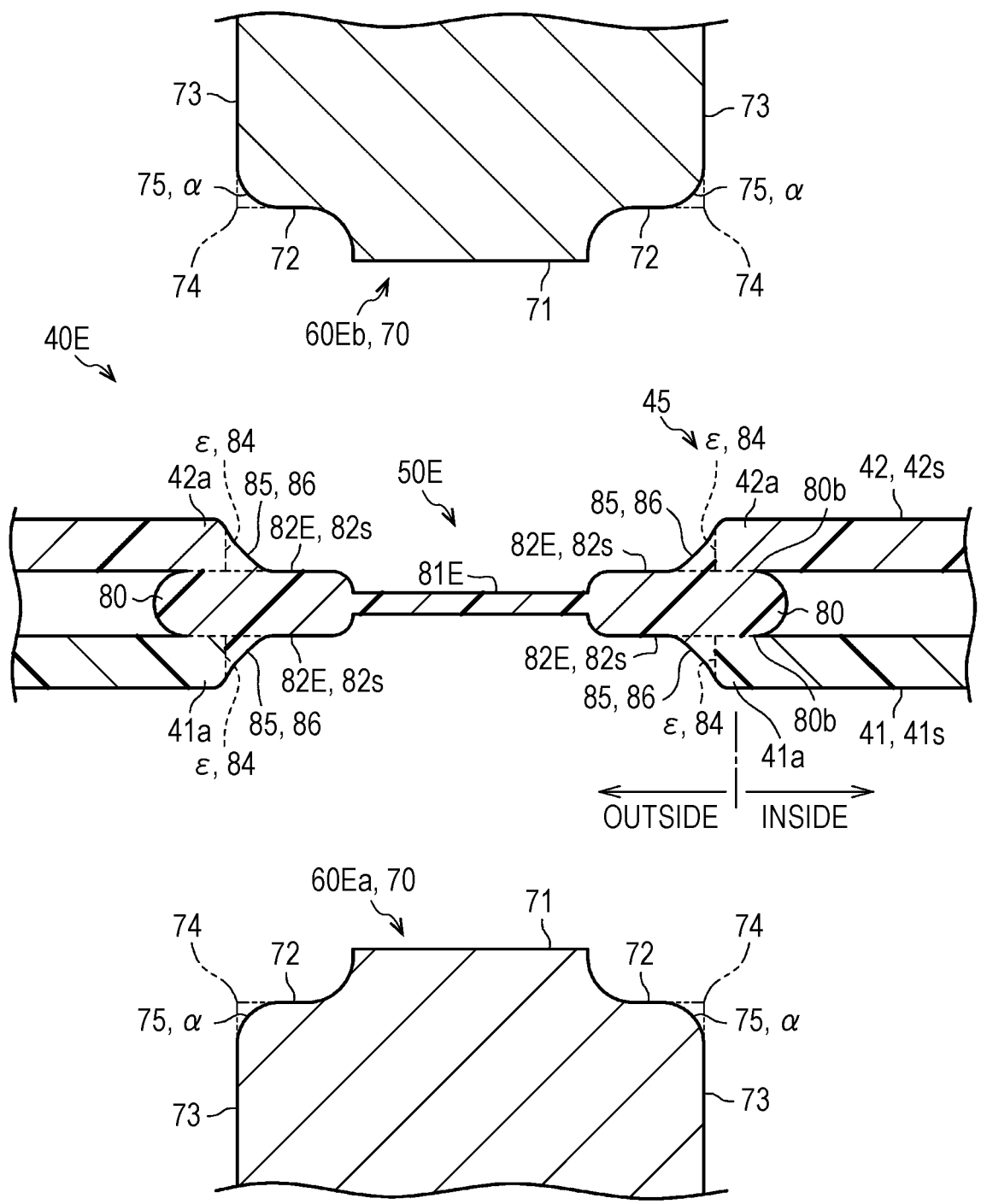
FIG. 13 is a cross-sectional view illustrating a method for manufacturing an air bag according to another example.

Also, as illustrated in FIG. 13, first and second welding molds 60Ea and 60Eb that sandwich the sheet materials 41, 42 in the stacking direction of the sheet materials 41 and 42 serving as base materials may be used to form a welded portion 50E surrounding the bag portion 45.

Specifically, each of the first and second welding molds 60Ea and 60Eb has the same cross-sectional shape as that of the welding mold 60 according to the above embodiment (refer to FIGS. 6 and 7). That is, the first and second welding molds 60Ea and 60Eb have the pressing surfaces 70 and 70 symmetrical to each other with the sheet materials 41 and 42 interposed therebetween. In this example, the first welding mold 60Ea is pressed from the lower side against an outer surface 41s of the sheet material 41 located on the lower side, and the second welding mold 60Eb is pressed from the upper side against the outer surface 42s of the sheet material 42 located on the upper side, to form the welded portion 50E.

That is, in an air bag 40E according to another example, a first welded portion 81E of the welded portion 50E is formed by being sandwiched between the first pressing surfaces 71 and 71 of the first and second welding molds 60Ea and 60Eb. Also, a second welded portion 82E is formed by being sandwiched between the second pressing surfaces 72 and 72 away from the first pressing surfaces 71 and 71 in the up-down direction, that is, in the stacking direction of the sheet materials 41 and 42. The constituents of the sheet materials 41 and 42 pushed away by the pressing surfaces 70 and 70 of the first and second welding molds 60Ea and 60Eb move to a position inside the bag portion 45 to cause the welding bead portion 80 protruding to the inside of the bag portion 45 to be formed.

Further, based on the shapes of the slope portions 75 and 75 provided on the pressing surfaces 70 and 70 of the first and second welding molds 60Ea and 60Eb, the filling portions 86 and 86 filling boundary portions ε and ε between the second welded portions 82E and 82E and the connecting ends 41a and 42a of the sheet materials 41 and 42 are formed. By the respective filling portions 86 and 86, the slopes 85 and 85 respectively connecting the outer surfaces 82s and 82s of the second welded portions 82E and 82E to the outer surfaces 41s and 42s of the sheet materials 41 and 42 are formed.

According to the above configuration, the two sheet materials 41 and 42 serving as base materials for the bag portion 45 can be welded more reliably. Also, on each side in the stacking direction of the sheet materials 41 and 42, the thickness D of the welded portion 50E along the direction of the surfaces of the sheet materials 41 and 42 near the base end portion 80b of the welding bead portion 80 increases. As a result, breakage of the welded portion 50E starting from the base end portion 80b of the welding bead portion 80 is less likely to occur, and the durability of the air bag 40 can be improved.

Also, at least one of the first and second welding molds 60Ea and 60Eb may be configured to include the second slope portion 90, the recess 97, or both the second slope portion 90 and the recess 97 as illustrated in the above other examples.

Also, in the above embodiment and each of the above other examples, the welding mold 60 has a symmetrical cross-sectional shape across a center line in a case in which the center line orthogonal to the pressing surface 70 is drawn. However, the welding mold 60 does not necessarily have to have such a line-symmetrical cross-sectional shape.

In the above embodiment and each of the above other examples, the welding mold 60 includes as the pressing surface 70 the first pressing surface 71 and the second pressing surface 72 further backward than the first pressing surface 71. However, the welding mold 60 may be configured not to include the second pressing surface 72. That is, the slope portion 75 may be formed at a boundary portion between the pressing surface 70 having no step and the side wall surface 73 of the welding mold 60 intersecting with the pressing surface 70. As for the method for forming the slope portion 75, a method other than chamfering may also be used.

In the above embodiment, although the high frequency welding is raised as an example of the welding method using the welding mold 60, a heat welding method in which the welding mold 60 is heated may be used.

A method for manufacturing an air bag includes forming a bag portion surrounded by a welded portion extending in an annular shape by pressing at least one welding mold against two sheet materials arranged to be stacked from a stacking direction of the sheet materials. The welding mold is pressed against the sheet materials to form the welded portion including a welding bead portion protruding to an inside of the bag portion between the sheet materials. A pressing surface of the welding mold against the sheet materials is provided with a slope portion facing in the stacking direction of the sheet materials and in a direction of the inside of the bag portion at a position further on an outside of the bag portion than a position at which the welding bead portion is formed.

That is, the welded portion of the sheet materials is formed at a position to which the pressing surface of the welding mold is pressed to cause the bag portion whose peripheral portion is surrounded by the welded portion to be formed. Also, at this time, the constituent of the sheet material pushed away by the pressing surface of the welding mold moves to a position inside the bag portion along the direction of the surfaces of the sheet materials to cause the welding bead portion protruding to the inside of the bag portion to be formed. Further, according to the above configuration, the constituent of the sheet material pushed away by the welding mold moves along the slope portion provided on the pressing surface. As a result, the thickness of the welded portion along the direction of the surfaces of the sheet materials near the base end portion of the welding bead portion increases. That is, it is possible to increase the thickness of a portion of the welded portion at which breakage starting from the base end portion of the welding bead portion is likely to occur. As a result, tear of the bag portion due to the breakage of the welded portion is less likely to occur, and the durability of the air bag can be improved.

In the method for manufacturing an air bag, the slope portion preferably has a convex curved surface shape.

According to the above configuration, it is possible to more effectively increase the thickness of the portion of the welded portion at which breakage is likely to occur.

In the method for manufacturing an air bag, the slope portion is preferably formed by chamfering a corner portion formed by the pressing surface and a side wall surface of the welding mold intersecting with the pressing surface.

According to the above configuration, the welding mold can easily be provided with a simple configuration with the slope portion facing in the stacking direction of the sheet materials and in the direction of the inside of the bag portion at a position further on the outside of the bag portion than the position at which the welding bead portion is formed.

In the method for manufacturing an air bag, the welding mold preferably includes as the pressing surface a first pressing surface pressed against an outer surface of the sheet material, and a second pressing surface pressed against the outer surface of the sheet material at a position further backward in a pressing direction of the welding mold than the first pressing surface. The slope portion is preferably provided at a boundary portion between the second pressing surface and the side wall surface of the welding mold intersecting with the second pressing surface.

According to the above configuration, the first welded portion is formed at a position to which the first pressing surface is pressed at a position outside the bag portion. Further, at a position to which the second pressing surface is pressed, the second welded portion is formed so as to bulge from the welding bead portion formed inside the bag portion to the outside of the bag portion. As a result, the thickness of the welded portion in the stacking direction of the sheet materials can be increased near the base end portion of the welding bead portion. Also, the constituent of the sheet material pushed away by the second pressing surface moves along the slope portion to the boundary portion between the second pressing surface and the side wall surface of the welding mold. As a result, the boundary portion between the second welded portion formed between the welding bead portion and the first welded portion and the connecting end of the sheet material connected to the second welded portion is filled. Further, the slope connecting the outer surface of the second welded portion to the outer surface of the sheet material is formed by the filling portion filling the boundary portion between the second welded portion and the connecting end of the sheet material. As a result, the thickness of the welded portion along the direction of the surfaces of the sheet materials near the base end portion of the welding bead portion increases. As a result, breakage of the welded portion starting from the base end portion of the welding bead portion is less likely to occur, and the durability of the air bag can be improved.

In the method for manufacturing an air bag, the welding mold preferably includes the slope portion which is second provided at a boundary portion between the first pressing surface and the second pressing surface.

According to the above configuration, tear of the bag portion due to breakage of the welded portion is much less likely to occur. Accordingly, the durability of the air bag can be improved.

In the method for manufacturing an air bag, the welding mold preferably includes a recess formed on the pressing surface.

According to the above configuration, the amount of the constituent of the sheet material that moves to the position inside the bag portion by being pushed away by the welding mold is reduced. Further, as a result, the amount of the welding bead portion, formed between the sheet materials, protruding to the inside of the bag portion is reduced. As a result, stress is less likely to concentrate on the base end portion of the welding bead portion. Accordingly, breakage of the welded portion is less likely to occur, and the durability of the air bag can be improved.

In the method for manufacturing an air bag, the welding molds which are first and second that sandwich the sheet materials in the stacking direction of the sheet materials are preferably used to form the welded portion surrounding the bag portion.

According to the above configuration, the two sheet materials serving as base materials for the bag portion can be welded more reliably. Also, on each side in the stacking direction of the sheet materials, the thickness of the welded portion along the direction of the surfaces of the sheet materials near the base end portion of the welding bead portion increases. As a result, breakage of the welded portion starting from the base end portion of the welding bead portion is less likely to occur, and the durability of the air bag can be improved.

An air bag includes a bag portion surrounded by a welded portion formed in an annular shape formed by two sheet materials welded to each other. The welded portion includes a first welded portion formed at a position outside the bag portion, a welding bead portion formed between the sheet materials in a state of protruding to an inside of the bag portion, a second welded portion formed at a position between the welding bead portion and the first welded portion in a state of bulging to an outside of the bag portion, and a filling portion forming a slope connecting an outer surface of the second welded portion facing in a stacking direction of the sheet materials to an outer surface of the sheet material by filling at the outside of the bag portion a boundary portion between the second welded portion and a connecting end of the sheet material connected to the second welded portion.

According to the above configuration, the thickness of the welded portion in the stacking direction of the sheet materials can be increased near the base end portion of the welding bead portion. Further, the thickness of the welded portion along the direction of the surfaces of the sheet materials near the base end portion of the welding bead portion increases. As a result, breakage of the welded portion starting from the base end portion of the welding bead portion is less likely to occur. As a result, the durability of the air bag can be improved.

In the air bag, the welded portion preferably includes a second filling portion forming a second slope connecting an outer surface of the first welded portion to the outer surface of the second welded portion by filling a boundary portion between the first welded portion and the second welded portion.

According to the above configuration, tear of the bag portion due to breakage of the welded portion is much less likely to occur. Accordingly, the durability of the air bag can be improved.

The air bag preferably includes a protruding portion protruding from the outer surface of the first welded portion.

According to the above configuration, in a case in which the welded portion is formed with use of the welding mold, the amount of the constituent of the sheet material that moves to the position inside the bag portion by being pushed away by the welding mold is reduced. Further, as a result, the amount of the welding bead portion, formed between the sheet materials, protruding to the inside of the bag portion is reduced. As a result, stress is less likely to concentrate on the base end portion of the welding bead portion. Accordingly, breakage of the welded portion is less likely to occur, and the durability of the air bag can be improved.

In the air bag, the welded portion preferably includes the second welded portion and the slope on each side in the stacking direction of the sheet materials.

According to the above configuration, on each side in the stacking direction of the sheet materials, breakage of the welded portion starting from the base end portion of the welding bead portion is less likely to occur. As a result, the durability of the air bag can be improved.

A vehicle seat apparatus includes the air bag described above.

According to the above configuration, high reliability can be ensured by improving the durability performance.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method for manufacturing an air bag, comprising:
    forming a bag portion surrounded by a welded portion extending in an annular shape by pressing at least one welding mold against two sheet materials arranged to be stacked from a stacking direction of the sheet materials,
    wherein the welding mold is pressed against the sheet materials to form the welded portion including a welding bead portion protruding to an inside of the bag portion between the sheet materials, and
    wherein a pressing surface of the welding mold against the sheet materials is provided with a slope portion facing in the stacking direction of the sheet materials and in a direction of the inside of the bag portion at a position further on an outside of the bag portion than a position at which the welding bead portion is formed.

2. The method for manufacturing an air bag according to claim 1, wherein the slope portion has a convex curved surface shape.

3. The method for manufacturing an air bag according to claim 1, wherein the slope portion is formed by chamfering a corner portion formed by the pressing surface and a side wall surface of the welding mold intersecting with the pressing surface.

4. The method for manufacturing an air bag according to claim 1, wherein the welding mold includes as the pressing surface
   a first pressing surface pressed against an outer surface of the sheet material, and
   a second pressing surface pressed against the outer surface of the sheet material at a position further backward in a pressing direction of the welding mold than the first pressing surface, and
   wherein the slope portion is provided at a boundary portion between the second pressing surface and the side wall surface of the welding mold intersecting with the second pressing surface.

5. The method for manufacturing an air bag according to claim 4, wherein the welding mold includes the slope portion which is second provided at a boundary portion between the first pressing surface and the second pressing surface.

6. The method for manufacturing an air bag according to claim 1, wherein the welding mold includes a recess formed on the pressing surface.

7. The method for manufacturing an air bag according to claim 1, wherein the welding molds which are first and second that sandwich the sheet materials in the stacking direction of the sheet materials are used to form the welded portion surrounding the bag portion.

8. An air bag comprising:
   a bag portion surrounded by a welded portion formed in an annular shape formed by two sheet materials welded to each other,
   wherein the welded portion includes
   a first welded portion formed at a position outside the bag portion,
   a welding bead portion formed between the sheet materials in a state of protruding to an inside of the bag portion,
   a second welded portion formed at a position between the welding bead portion and the first welded portion in a state of bulging to an outside of the bag portion, and
   a filling portion forming a slope connecting an outer surface of the second welded portion facing in a stacking direction of the sheet materials to an outer surface of the sheet material by filling at the outside of the bag portion a boundary portion between the second welded portion and a connecting end of the sheet material connected to the second welded portion.

9. The air bag according to claim 8, wherein the welded portion includes a second filling portion forming a second slope connecting an outer surface of the first welded portion to the outer surface of the second welded portion by filling a boundary portion between the first welded portion and the second welded portion.

10. The air bag according to claim 8, further comprising:
   a protruding portion protruding from the outer surface of the first welded portion.

11. The air bag according to claim 8, wherein the welded portion includes the second welded portion and the slope on each side in the stacking direction of the sheet materials.

12. A vehicle seat apparatus comprising the air bag according to claim 8.

* * * * *